United States Patent [19]
Lampe et al.

[11] Patent Number: 5,633,893
[45] Date of Patent: May 27, 1997

[54] DIGITAL MODULATION METHOD WITH CONTROLLED ENVELOPE VARIATION

[75] Inventors: Ross W. Lampe, Raleigh; Jyun-chen Chen, Chapel Hill, both of N.C.

[73] Assignee: Ericsson Inc., Research Triangle Park, N.C.

[21] Appl. No.: 313,599

[22] Filed: Sep. 29, 1994

[51] Int. Cl.$^6$ .................................................... H04K 1/02
[52] U.S. Cl. ...................... 375/297; 375/272; 375/275; 375/278; 375/303; 375/340; 375/348; 332/100; 332/124; 455/44; 455/110; 364/724.16
[58] Field of Search ................................. 375/262, 266, 375/271, 272, 273, 275, 278, 285, 296, 297, 298, 302, 303, 322, 334, 340, 341, 348–350; 364/724.01, 724.16–724.19; 332/100, 103, 117, 120, 123, 124, 144, 155, 183; 455/42, 43, 44, 110

[56] References Cited

U.S. PATENT DOCUMENTS

| | | | |
|---|---|---|---|
| 3,747,024 | 7/1973 | Choquet et al. | 332/9 R |
| 3,993,868 | 11/1976 | Balcewicz | 375/274 |
| 4,567,602 | 1/1986 | Kato et al. | 375/298 |
| 4,646,327 | 2/1987 | Kojima et al. | 375/298 |
| 4,686,490 | 8/1987 | Cressey | 332/1 |
| 4,750,192 | 6/1988 | Dzung | 375/308 |
| 4,757,519 | 7/1988 | Collison et al. | 375/296 |
| 4,764,940 | 8/1988 | Paneth et al. | 375/308 |
| 4,843,613 | 6/1989 | Crowle | 375/295 |
| 4,873,500 | 10/1989 | Genrich | 332/104 |
| 4,893,316 | 1/1990 | Janc et al. | 375/271 |
| 4,943,983 | 7/1990 | Critchlow | 375/330 |
| 5,068,874 | 11/1991 | Leitch | 375/278 |
| 5,090,026 | 2/1992 | Stern et al. | 375/305 |
| 5,107,520 | 4/1992 | Karam et al. | 375/298 |
| 5,121,412 | 6/1992 | Borth | 375/308 |
| 5,140,613 | 8/1992 | Birgenheier et al. | 375/308 |
| 5,319,676 | 6/1994 | Van Dasler et al. | 375/296 |
| 5,377,229 | 12/1994 | Wilson et al. | 375/223 |
| 5,446,760 | 8/1995 | Bienz et al. | 375/295 |
| 5,509,033 | 4/1996 | Chen | 375/298 |

OTHER PUBLICATIONS

Globecom '83. IEEE Global Telecommunications Conference. Conference Record, San Diego, CA, USA, 28 Nov. 11 Dec. 1983, 1983, New York, NY, USA, IEEE, USA, pp. 1027–1031, vol. 2, Wickert M.A. et al., "Performance degradations due to channel impairments in multi–h continuous–phase modulation systems".

Eurocon '88, 8th European Conference on Electrotechnics, Conference Proceedings on Area Communication, Stockholm, 13–17 Jun. 1988, pp. 68–71, XP 000011193, Heath, M.R. et al., "A New Class of Modulation Schemes with Variable Envelope".

(List continued on next page.)

*Primary Examiner*—Stephen Chin
*Assistant Examiner*—Amanda T. Le
*Attorney, Agent, or Firm*—Nixon & Vanderhye

[57] ABSTRACT

Continuous phase modulated (CPM) signals, such as quaternary CPFSK signals, are filtered to limit their bandwidth while simultaneously minimizing the amount of amplitude modulation and intersymbol interference introduced by this filtering process. By designing a modulation filter such as a finite impulse response (FIR) filter to add only a nominal, controlled amount of amplitude modulation, high efficiency, nonlinear power amplifiers may be employed to transmit the filtered CPFSK signals. Although the filter adds a small amount of amplitude modulation and intersymbol interference, digital signal processor-based receivers satisfactorily demodulate this type of signal using sequence estimation algorithms such as the Viterbi algorithm. Thus, the filtering of CPM signals permits narrowing of the transmitted signal spectrum while managing the intersymbol interference resulting from the controlled amount of amplitude modulation added by filtering. Narrowed bandwidth along with high efficiency, nonlinear power amplifiers make the present invention particularly well suited to narrowband mobile radio communications.

17 Claims, 5 Drawing Sheets

OTHER PUBLICATIONS

"Advances in Constant Envelope Coded Modulation", Anderson et al, IEEE Communications Magazine, Dec. 1991.

"Continuous Phase Modulation–Part I: Full Response Signaling", Aulin et al, IEEE Transactions On Communications, vol. COM–29, No. 3, Mar. 1981.

Decoding of Severely Filtered Modulation Codes Using the (M,L) Algorithm, Seshadri et al, IEEE Journal On Selected Areas In Communications, vol. 7, No. 6, Aug. 1989.

"Continuous Phase Modulation", Sundberg, IEEE Communications Magazine, vol. 24, No. 4, Apr. 1986.

DIGITAL MODULATION METHOD WITH CONTROLLED ENVELOPE VARIATION

FIELD OF THE INVENTION

The present invention relates generally to constant envelope modulation, and more particularly, to filtering a phase modulated signal.

BACKGROUND AND SUMMARY OF THE INVENTION

For mobile radio communications, constant envelope modulation techniques (sometimes referred to as angle modulation) are preferable from the standpoint of existing constraints in mobile transmitter power and because they permit use of high efficiency nonlinear power amplifiers. However, another competing goal of digital mobile communications is spectral efficiency; that is, to support as high a data rate as possible within a confined, narrow bandwidth.

Constant envelope, continuous phase modulation (CPM) techniques have been studied by communications engineers for possible application to narrow band radio communications. One specific method of CPM is quaternary continuous phase frequency shift keying (CPFSK). CPM techniques emphasize both power and bandwidth efficiency within a constant amplitude envelope. Data symbols represented as phase shifts can be expressed as the integral of frequency pulses from the modulator. The shape of the frequency pulse determines the type of CPM modulation. Common pulse shapes include rectangular (MSK) and raised cosine. These frequency pulses last from one to several (L) symbol periods (T) depending upon the degree of intersymbol interference. In general, one of (M) possible symbols is transmitted per symbol period. More detailed descriptions of CPM and in particular quaternary CPFSK may be found in the following articles on this subject: "Advances In Constant Envelope Coded Modulation," by John Anderson and Carl-Eric Sundberg, IEEE Communications Magazine, pp. 36-45, December 1991; "Continuous Phase Modulation," by Carl-Eric Sandberg, IEEE Communications Magazine, pp. 25-38, April 1986; "Continuous Phase Modulation—Part 1: Full Response Signalling," by Tor Aulin and Carl-Eric Sundberg, IEEE Transactional Communications, pp. 196-209, March 1981.

A difficulty with CPM techniques like quaternary CPFSK stems from the nonlinearity of the modulation. Linear modulation techniques such as π/4-DQPSK can theoretically be demodulated without intersymbol interference (ISI) using a Nyquist filter. In contrast, nonlinear CPFSK modulated signals cannot be Nyquist filtered and demodulated without intersymbol interference. As a result, CPFSK and other continuous phase modulation techniques have not been used in mobile radio communications because of an inability to deal with this intersymbol interference at the receiver site of each radio. Additionally, CPM signals cannot be filtered to confine their spectrum (which is highly desirable in narrow band mobile radio communications) without further adding to the intersymbol interference problem.

While linear modulation techniques such as π/4-DQPSK are desirable from the standpoint of reduced ISI, a serious design drawback with such linear modulation techniques is that they require linear power amplifiers. Linear power amplifiers are inefficient and require considerably more power to transmit at a particular level than nonlinear power amplifiers. This is particularly undesirable in mobile radio communications where battery size and life are limited. Specifically, π/4-DQPSK modulated signals possess both amplitude modulated and phase modulated components. Any amplitude modulation in the signal spectrum will be mixed with intermodulation components in a nonlinear power amplifier which results in spreading of the spectrum thereby defeating the intent of narrow band transmissions.

The present invention overcomes these drawbacks by providing an apparatus and method for filtering CPM signals, such as quaternary CPFSK signals, to limit the bandwidth occupied by the modulated signals while simultaneously minimizing the amount of amplitude modulation and intersymbol interference introduced by this filtering process. By designing a modulation filter such as a finite impulse response (FIR) filter to add only a nominal, controlled amount of amplitude modulation, high efficiency, nonlinear power amplifiers may be employed to transmit filtered CPM signals. Although the filtering adds a small amount of amplitude modulation (AM) and intersymbol interference, digital signal processor-based demodulators satisfactorily demodulate this type of signal using sequence estimation algorithms such as the Viterbi algorithm. Accordingly, the present invention filters the CPM signals to narrow the signal spectrum for use in mobile narrowband communication while managing the intersymbol interference resulting from the controlled amount of amplitude modulation added by filtering at a tolerable level. Since only nominal amounts of amplitude modulation are added, high efficiency nonlinear power amplifiers may be employed.

A communications system is provided that includes a plurality of radio transceivers. Each transceiver includes a receiver and a transmitter. Each transmitter includes a constant envelope modulator, such as a quaternary continuous phase frequency shift keying modulator, for modulating a carrier with data and thereby generating a modulated signal having a constant amplitude. A modulator filter limits the bandwidth of the modulated signal and generates a filtered signal which adds a controlled amount of amplitude modulation to the modulated signal. The transmitter uses a nonlinear power amplifier for nonlinearly amplifying the filtered signal. The receiver includes a demodulator having a sequence estimator for estimating transmitted symbol sequences in the presence of intersymbol interference.

The filter may be a digital finite impulse response filter including N filter tap coefficients, each corresponding filter tap coefficient being stored in a corresponding location in a memory. A register stores N samples of the modulated signal. A series of multipliers multiply the N filter tap coefficients with the N samples currently stored in the register to generate N products. An accumulator sums the N products to produce the filtered modulated signal. Alternatively, the digital finite impulse response filter may include memory for storing a table of products at corresponding address locations in the memory, each product being the result of multiplying a particular filter tap coefficient with a particular phase state. The N samples stored in the register are used to address one of the address locations and retrieve the N products for each set of N samples stored in the register.

The amount of amplitude modulation generated by the filter is limited base on an amount of resulting intersymbol interference that can be tolerated by the sequence estimator. In one embodiment, the amount of amplitude modulation generated by the filter is based on the ratio of the maximum amplitude of the modulated signal to the minimum amplitude of the modulated signal.

BRIEF DESCRIPTION OF THE DRAWINGS

A more complete appreciation of the invention and its advantages will become better understood by reference to the following detailed description considered in connection with accompanying drawings wherein.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that this present invention may be practiced in other embodiments that depart from these specific details. In other instances, detailed descriptions of well known methods, devices and circuits are omitted so as not to obscure the description of the present invention with unnecessary detail. In addition, while the preferred embodiment of the present invention is described in the context of CPM, and in particular quaternary CPFSK modulation, those skilled in the art will appreciate that the present invention may be applied to other constant envelope modulation techniques.

Figure 1:
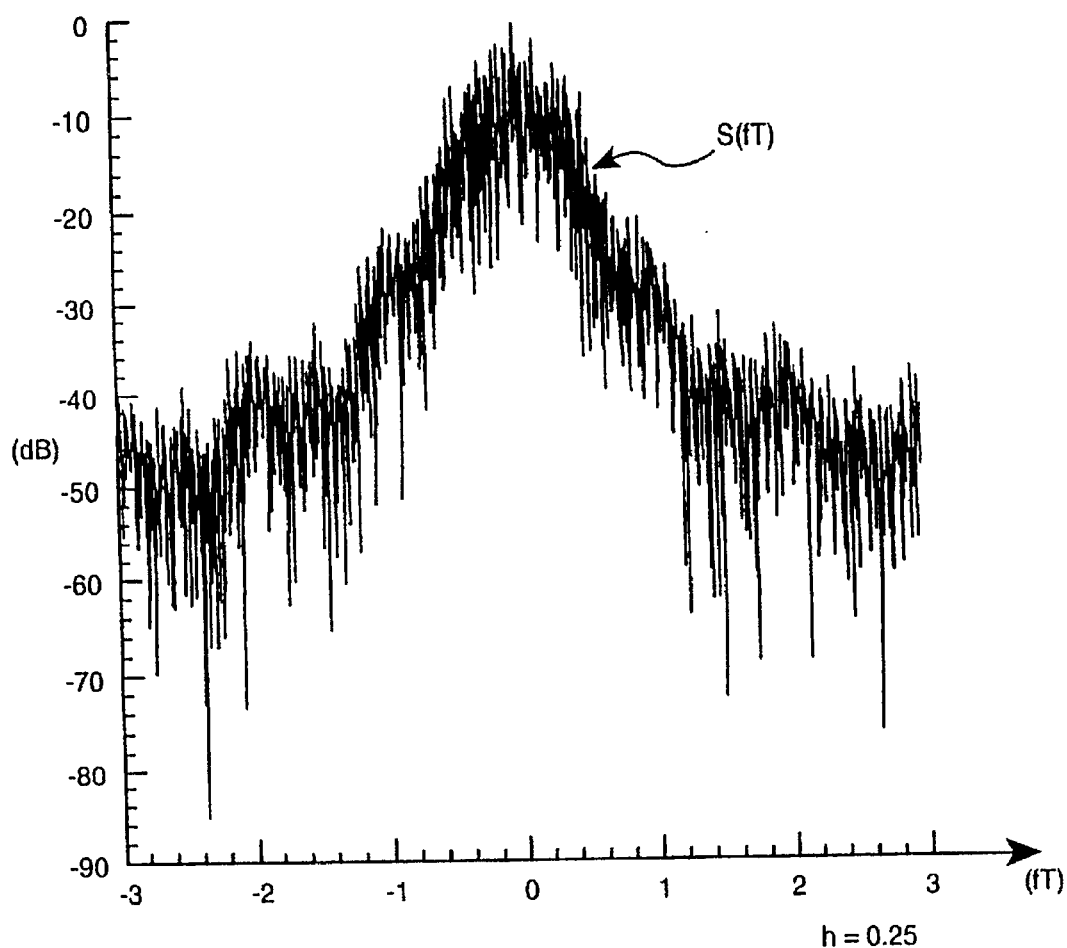
FIG. 1 is an amplitude versus frequency plot of a conventional quaternary CPFSK signal with frequency normalized with respect to symbol period T.

FIG. 1 illustrates a typical frequency response of a quaternary CPFSK modulated signal S(ft) with frequency normalized for the symbol period T at a modulation index h=0.25. A typical quaternary continuous phase frequency shift key modulated signal S(t) is defined by:

$$S(t) = A\cos(\omega_c t + \theta(T)) \quad (1)$$

$$S(t) = A\cos(\omega_c t + \theta(T_{n-1}) + 2\pi F_d (T - nT) D_n) \quad (2)$$

where $\omega_c$ is the carrier frequency t equals time

T equals symbol period $\theta(T_{n-1})$ equals the phase at the end of symbol period (n−1) (e.g. at time (n−1) T)

$D_n$ equals the nonreturn to zero (NRZ) input value of the information to be transmitted, e.g., in quaternary CPFSK equals −3, −1, 1, 3.

$F_d$ equals the peak frequency deviation.

The modulation index h is defined as: $h=2F_d T$ which may be specified as h=0.25.

While most of the power of the normalized frequency spectrum of the quaternary CPFSK modulated signal in FIG. 1 is confined within the region of normalized frequency, i.e. |fT|≦1.0, a nominal amount of signal energy falls outside of this region. Demanding narrow band communication systems, such as digital land mobile radio communications, require the power outside the signal channel bandwidth to be typically less than −60 dB below that of the total power in the signal channel. From inspection of FIG. 1, it is clear that filtering is needed to achieve this attenuated level of out of band energy.

Figure 2:
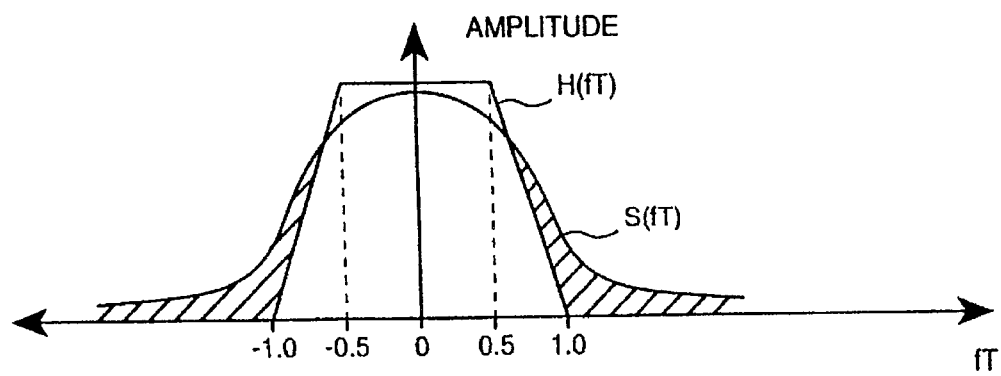
FIG. 2 is amplitude versus frequency plot with frequency normalized with respect to symbol period T showing a preferred exemplary transfer function of a modulation filter for filtering a quaternary CPFSK modulated signal.

FIG. 2 is a simplified frequency response diagram showing the quaternary CPFSK modulated signal S(fT) as a smooth bell-shaped curve and the nominal amplitude response of an ideal filter H(fT) design. Using any suitable type of filter having the response H(fT), the present invention narrows the bandwidth occupied by the signal S(fT) by attenuating the nominal amount of signal energy in the cross-hatched portions of S(fT).

One specific embodiment of a modulation filter designed in accordance with the present invention strives to achieve the following characteristics:

1. The filter amplitude response is flat to a break point at approximately the normalized frequency |fT|=0.5. This flat response ensures that most of the energy of the modulated signal is unaffected by filtering which reduces the amount of generated signal amplitude modulation and therefore minimizes the intersymbol interference.

2. The filter's phase response is nominally flat across the filter bandwidth to minimize the intersymbol interference by not distorting the desired phase modulation.

3. The filter provides approximately 10 dB of attenuation in the signal spectrum at the edge of the signal bandwidth.

4. While the shape of the filter attenuation is shown to be linear in FIG. 2 between the break point and the band edge, any gradual, monotonic rolloff is acceptable.

Of course, practical limits to filter implementation, such as truncation effects in digital filters or limited numbers of zeroes and/or poles in analog filters prevent the filter from being perfectly flat inside the break point, from having perfectly linear rolloff from the break point to the band edge, from having perfectly linear phase, etc. However, such perfection is not required. Characteristics (1)–(4) are merely guidelines for designing the filter using either digital techniques or analog components.

Figure 3:
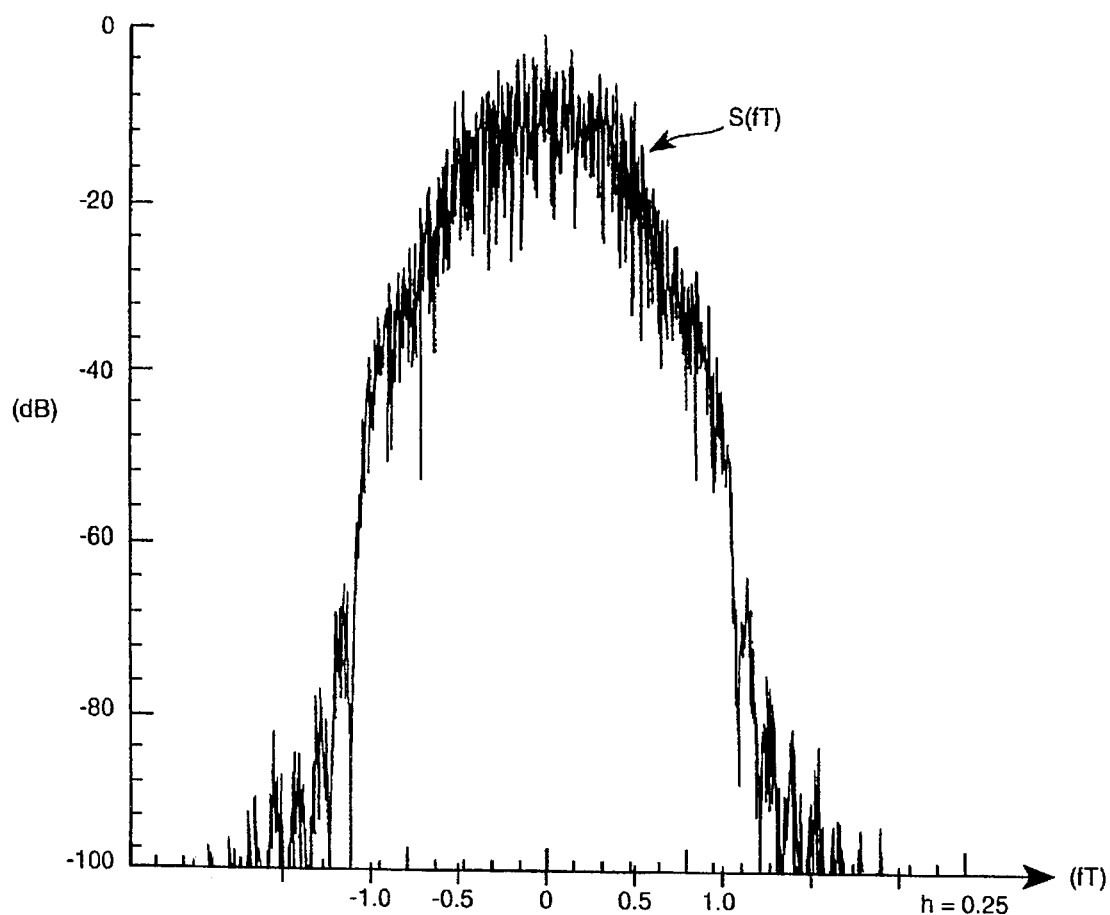
FIG. 3 is an exemplary amplitude versus frequency plot of a quaternary CPFSK signal filtered in accordance with the present invention with frequency normalized with respect to symbol period T.

An illustration of an exemplary CPFSK signal filtered using a finite impulse response (FIR) filter designed following guidelines described above is shown in FIG. 3. The signal S(fT) is normalized with respect to the symbol period T for a modulation index h=0.25. Comparing FIGS. 1 and 3, it is readily apparent that by removing only relatively nominal amount of signal energy, the filtered CPFSK signal occupies considerably less bandwidth than the unfiltered CPFSK signal in FIG. 1.

Figure 4A:
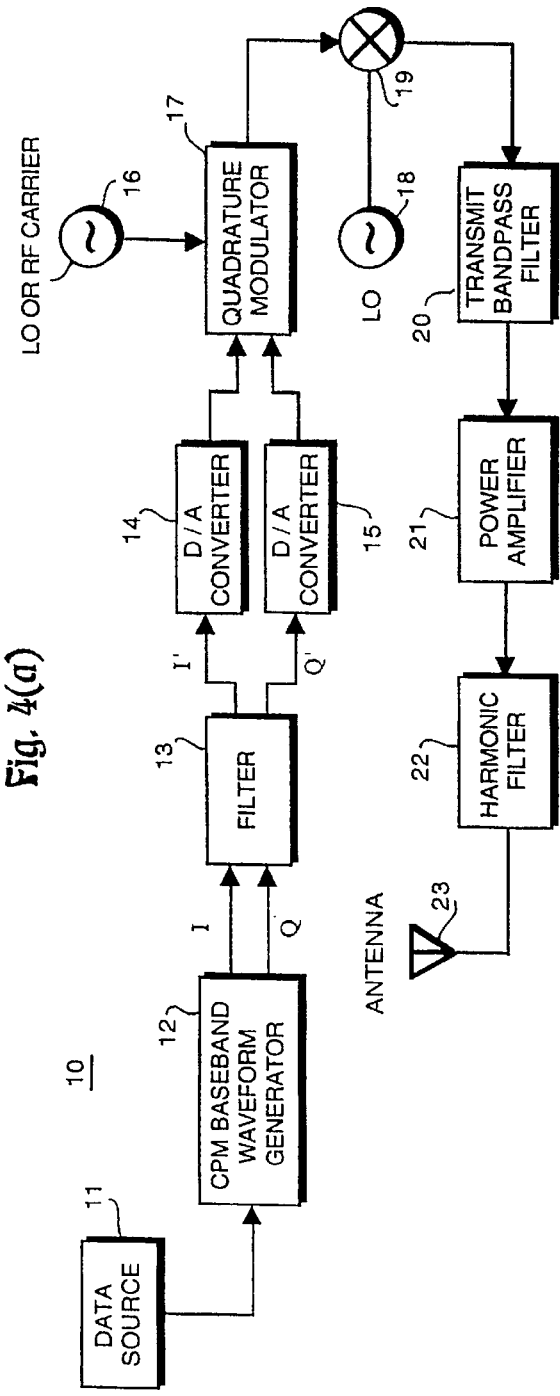
FIGS. 4(a) and 4(b) are function block diagrams showing an exemplary rf transceiver in which the present invention may be implemented.
Figure 4B:
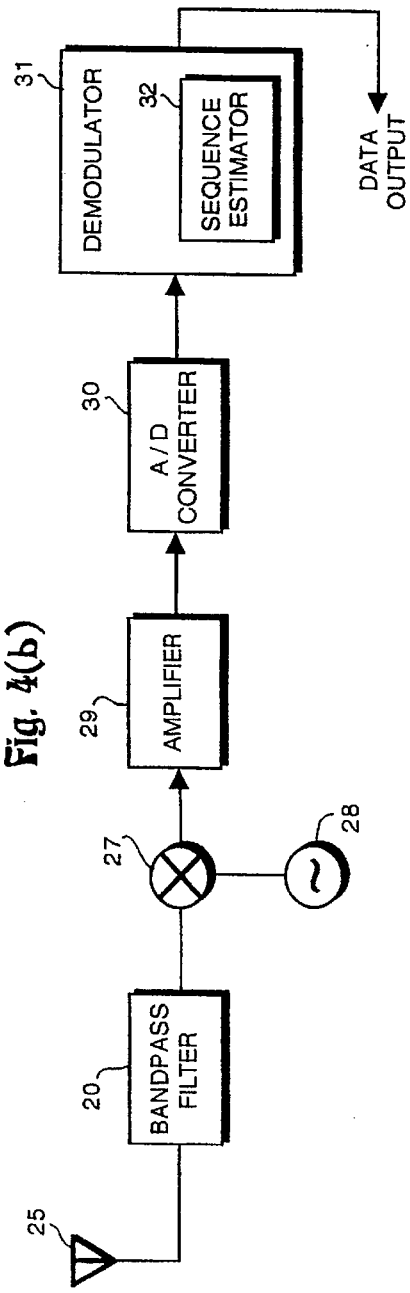

The present invention is particularly applicable to the transmitter section of mobile transceivers. In the transmitter 10 shown in FIG. 4(a), data source 11 provides a serial bit stream at a clock rate of 1/T, where T represents the symbol clock. For example, data source 11 provides a digitally encoded voice or data signal, and continuous phase modulation (CPM) baseband waveform generator 12 translates the serial bit stream into the baseband representation of the desired CPM signal in quadrature (I/Q) format. RF carrier source or local oscillator 16 provides a radio frequency carrier signal $f_c$ and may be, for example, a frequency synthesizer. The filtered baseband signal along with the carrier frequency signal are applied to quadrature modulator 17.

Quadrature modulator 17 employs the well known technique of quadrature modulation wherein the in-phase (I) components and the quadrature phase (Q) components of the signals are generated and used to create the CPFSK signal as will be described in more detail below. A digital read only memory (ROM) may be used for example to store instantaneous values of the I and Q components such that the I and Q components can be obtained from a lookup table. The modulated data are then applied to a modulation filter 13 designed to have a filter transfer function characteristic H(fT) such as that shown in FIG. 2. Filter 13 can be any type of analog or digital filter, and in the preferred embodiment, is a digital, finite impulse response (FIR) filter described in more detail below. The filtered quadrature signals are then applied to digital to analog (D/A) converters 14 and 15 which generates analog CPFSK signals at a multiple of the 1/T clock rate. Although the function block diagram shows separate blocks for various functions performed by transmitter 10, the functions of the waveform generator 12 and filter 13 for example may preferably be performed in a suitably programmed digital signal processor (DSP).

The modulated and filtered signal is then applied to mixer 19 which frequency translates the CPFSK signal to a higher rf frequency by mixing the CPFSK signal with the high frequency output of local oscillator 18. The output of mixer 19 may then be bandpassed filtered by transmit bandpass filter 20 to remove undesired signals generated by the mixing process. The bandpass filter output is then applied to a nonlinear, high efficiency, power amplifier 25 for transmission via antenna 23.

In the receiver 24, signals are received over an antenna 25 (which may be used in common with the transmit section via a duplexer not shown) and down converted in frequency in mixer 27 using the appropriate rf frequency generated by local oscillator 28. The mixer output is amplified in amplifier 29 and converted to digital format using analog-to-digital (A/D) converter 30. The digital data is demodulated in demodulator 31 using a sequence estimator 32. The functions of demodulator 31 are preferably performed using a digital signal processor (DSP) wherein sequence estimation is performed following for example programmed procedures for implementing the well known Viterbi algorithm. An important feature of the Viterbi algorithm is optimal sequence estimation in the presence of intersymbol interference (ISI) to maintain an acceptable bit error rate (BER). A data output signal is generated from demodulator 31 for further formatting and processing.

Figure 5:
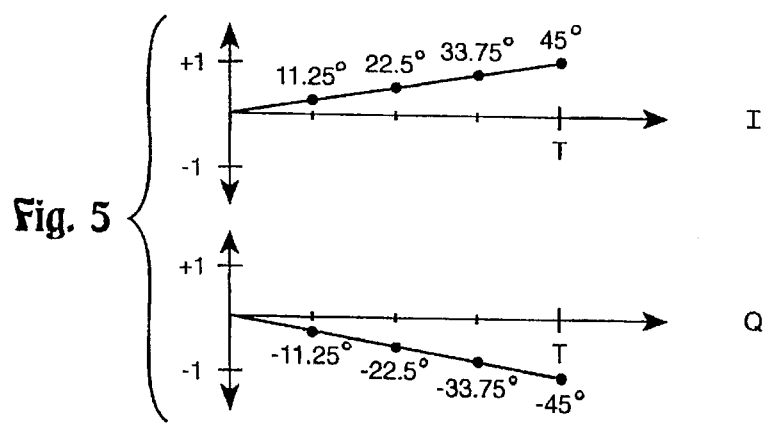
FIG. 5 illustrates the manner in which a digital CPFSK signal may be sampled before filtering in accordance with the present invention.

In quaternary CPFSK using a modulation index of h=0.25, the end points of the modulated signal are alternatively one of four possibilities (0°, 90°, 180°, or 270°) followed by another set of four possibilities (45°, 135°, 225°, or 315°). If four equally spaced samples are taken per symbol as shown for example in FIG. 5 for 45° and −45° phase shifts for the I and Q channels, respectively, the samples necessarily fall at one of only thirty-two possibilities (0.0°, 11.25°, 22.5°, 33.75°, 45°, ... 337.5°, or 348.75°). Alternatively, if eight equally spaced samples are taken per symbol, these samples fall at any one of only sixty-four possibilities (0.0°, 6.25° ... 353.75°). This finite number of possible phases is exploited in the present invention to simplify the filter 13 by replacing the traditional digital filter multiply-accumulate operations with a memory look-up function. For example, the baseband signal output samples from the CPM waveform generator 12 are processed in filter 13 illustrated in FIG. 6 as a finite impulse response (FIR) digital filter. A six bit shift register is shown receiving the waveform generator output. However, other length shift registers could obviously be used, such as an eight or ten bit shift register. A finite impulse response filter multiples past and future sample values of the baseband signal at any one time by predetermined filter tap coefficients stored in corresponding memory locations 62 included in discrete memory or in ROM or RAM included with the DSP. Those products are summed in an accumulator 76 to form the filtered baseband signal.

Figure 7:
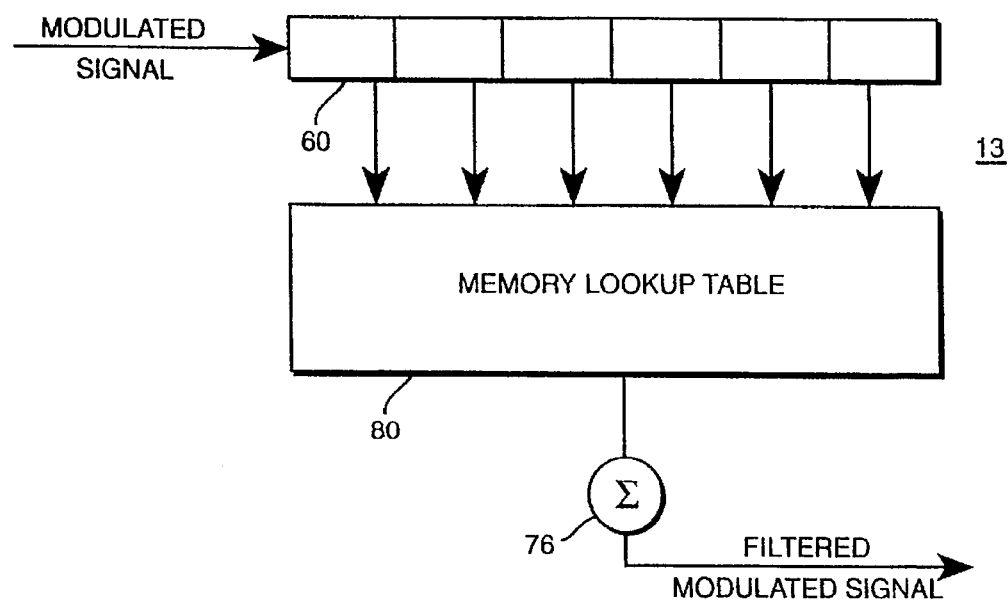
FIG. 7 illustrates another embodiment of a finite impulse response (FIR) filter which may be used in implementing the present invention.

To avoid the numerous complex multiplications performed by multipliers 64, 66, 68, 70, 72, and 74, another FIR implementation of filter 13 utilizes a table lookup technique illustrated in FIG. 7. As described with respect to FIG. 5, the quaternary CPFSK signal for a modulation index of h=0.25 can be sampled at a finite number of phase states such that each symbol can be sampled at either four (or eight) equally spaced intervals. This results in either 32 (or 64) possible phase states. All 32 (or 64) combinations of these phase states are then premultiplied with appropriate filter tap weights and the products stored in memory lookup table 80. The output of shift register 60 are then used to address or retrieve the appropriate premultiplied phase state and filter tap products and output those products to the accumulator 76 to generate the filtered and modulated signal. Obviously, this embodiment has the advantage of speed because memory addressing functions can be performed more quickly then complex multiplications.

Figure 6:
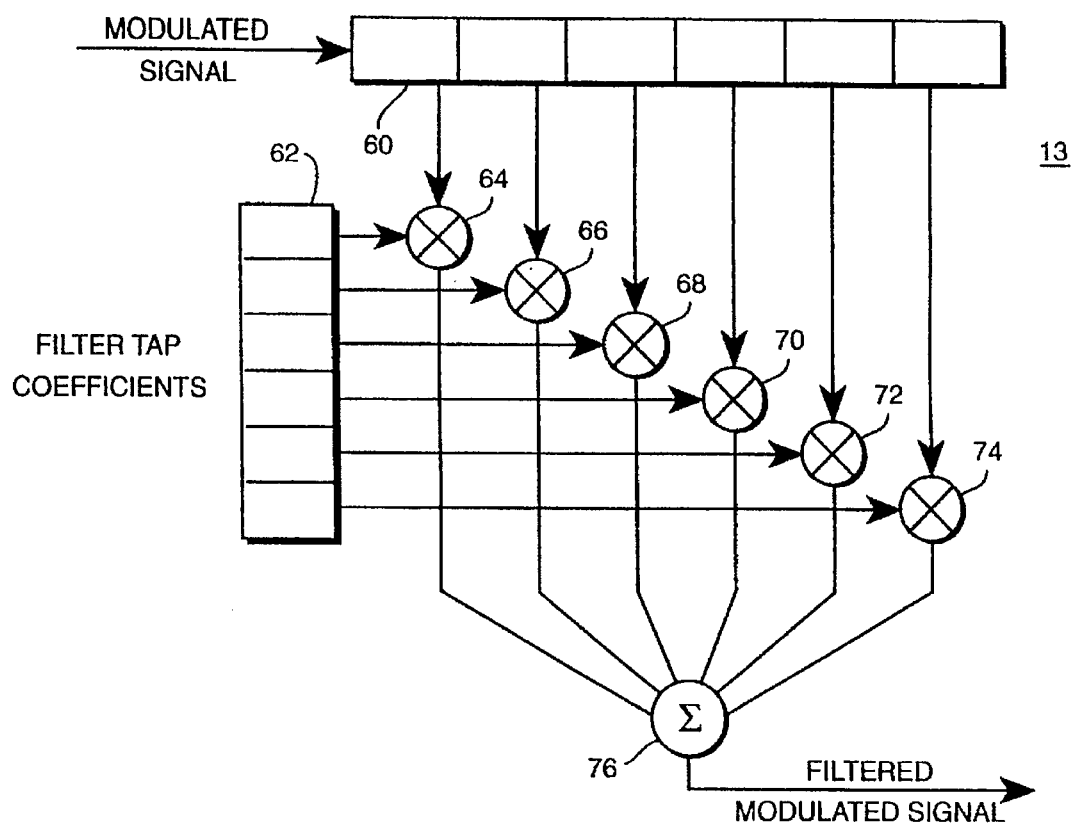
FIG. 6 is one embodiment of a finite impulse response (FIR) filter which may be used in implementing the present invention.

The filter tap coefficients used in the FIR filters shown in FIGS. 6 and 7 may be determined using conventional digital filter design packages to generate approximately a filter transfer function H(fT) such as that shown in FIG. 2. An important filter design factor is the amount of amplitude modulation added to the quaternary CPFSK signal by the filter 13. In the present invention, the amount of amplitude modulation is controlled to limit the amount of intersymbol interference to a level that can be tolerated by the sequence estimator 32, (e.g. a Viterbi estimator), in the receiver demodulator 31 of the transceiver. This tolerance level may be established for example by setting a maximum BER for the sequence estimator.

Figure 8:
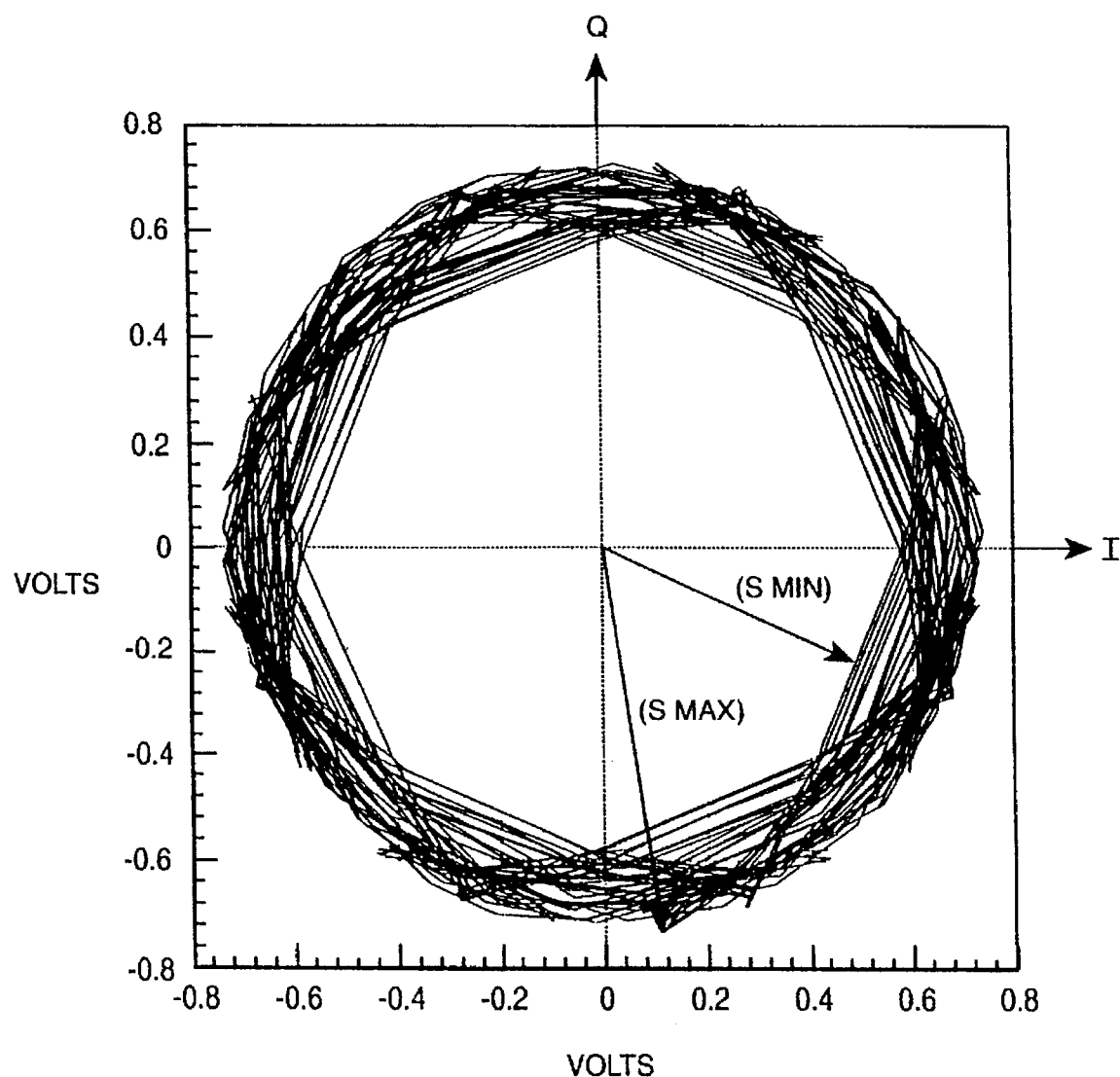
FIG. 8 is a constellation diagram illustrating in the complex domain the signal path of a quaternary CPFSK signal filtered in accordance with the present invention.

Another method of quantifying the nominal amount of amplitude modulation controllably added to the CPFSK signal is described now in conjunction with FIG. 8. FIG. 8 is a constellation diagram showing the phase path of a quaternary CPFSK signal in the IQ complex domain filtered in accordance with the present invention. The ratio of the peak or maximum signal magnitude |Smax| of the signal vector to the minimum modulated signal vector magnitude |Smin| may be limited to a predetermined design value, for example, to about 1 dB or less. The magnitude of this ratio represents the amount of controlled amplitude modulation added to the otherwise constant envelope CPFSK modulated signals. This ratio is a useful mechanism for limiting the resultant amplitude modulation while still achieving the necessary amount of bandwidth constraint. Obviously, the more (or less) robust the sequence estimator, the larger (or smaller) the ratio of |Smax|/|Smin| that can be tolerated.

Accordingly, the present invention employs a constant envelope modulation with only a nominal controlled amount of added amplitude modulation. Digital FIR filtering further allows transmission of the constant envelope modulated signal in a relatively narrow bandwidth. Even though such filtering adds some amplitude modulation and resulting ISI, the amount of added AM is limited to a relatively small value, and therefore, high efficiency, non-linear power amplifiers can be used in low power radio transmitters. Moreover, digital signal processing demodulation techniques, i.e. sequence estimation, in the receiver portion of the radio tolerate the resulting ISI.

Although the preferred embodiment of the present invention has been illustrated and in that form described in detail, it will be readily apparent to those skilled in the art that various modifications may be made therein without departing from the spirit of the invention or from the scope of the appended claims.

What is claimed is:

1. A communications system including a plurality of radio transceivers with each transceiver comprising:

a receiver, and a transmitter including:

a constant envelope waveform generator for creating a baseband signal having a constant amplitude;

a filter for limiting the bandwidth of the baseband signal to generate a filtered signal and thereby adding a controlled amount of amplitude modulation to the baseband signal; and a nonlinear power amplifier for nonlinearly amplifying the filtered signal, wherein the constant envelope waveform generator having a quaternary continuous phase frequency shift modulator employs a modulation index h=0.25 and samples each symbol four or eight times to limit a number of possible phase shift possibilities to 32 or 64, respectively.

2. The communications system according to claim 1, wherein an amplitude response of a transfer function of the filter is substantially flat to a break point at approximately a normalized frequency of |fT|=0.5 where f is frequency and T is a symbol period of the data and rolls off at the break point to minimal attenuation at approximately a normalized frequency of |fT|=1.0.

3. The communications system according to claim 1, wherein the filter is a digital finite impulse response filter including:

N filter tap coefficients, each corresponding filter tap coefficient being stored in a corresponding location in a memory;

a register for storing N samples of the modulated signal;

means for multiplying the N filter tap coefficients with the N samples currently stored in the register to generate N products; and an accumulator for summing the N products to produce the filtered baseband signal.

4. The communications system according to claim 1, wherein the filter is a digital finite impulse response filter including:

a memory for storing a table of products at corresponding address locations in the memory, each product being the result of multiplying a particular filter tap coefficient with a particular phase state;

a register for storing N samples of the modulated signal, said N samples being used to address one of the address locations and retrieve N products for each set of N samples stored in the register; and an accumulator for summing the N products to produce the filtered modulated signal.

5. The communications system according to claim 1, wherein the amount of amplitude modulation generated by the filter is determined based on a ratio of a maximum amplitude of the modulated signal to a minimum amplitude of the modulated signal.

6. The communications system according to claim 5, wherein the ratio is equal to or less than approximately one decibel.

7. A communications system including a plurality of radio transceivers with each transceiver comprising:

a transmitter including:

a constant envelope waveform generator for creating a baseband signal having a constant amplitude;

a filter for limiting the bandwidth of the baseband signal to generate a filtered signal and thereby adding a controlled amount of amplitude modulation to the baseband signal;

a nonlinear power amplifier for nonlinearly amplifying the filtered signal; and a receiver having a demodulator including a sequence estimator for estimating transmitted symbol sequences in the presence of intersymbol interference, wherein the amount of amplitude modulation generated by the filter is limited by an amount of resulting intersymbol interference that can be tolerated by the sequence estimator.

8. A communications system including a plurality of radio transceivers with each transceiver comprising:

a digital signal processor including:

means for phase modulating symbol sequences onto a carrier to generate a phase modulated signal having a constant amplitude, and means for digitally filtering the phase modulated signal to generate a filtered signal, said means for filtering adding an amount of amplitude modulation to the phase modulated signal corresponding to a degree to which the phase modulated signal is bandpass filtered, wherein the degree to which the phase modulated signal is filtered is based on an amount of intersymbol interference caused by the added amplitude modulation and by a maximum allowed level of amplitude modulation;

an amplifier for nonlinearly amplifying the filtered, phase modulated signal; and an antenna for transmitting a signal generated by the amplifier.

9. The communications system according to claim 8, wherein the digital signal processor further includes:

means for demodulating a transmitted signal received via the antenna including means for estimating a sequence of symbols originally transmitted, wherein the amount of intersymbol interference is determined based on the a symbol error rate performance preset for the means for estimating.

10. The communications system according to claim 9, wherein the amount of amplitude modulation generated by said means for filtering is limited by an amount of resulting intersymbol interference that can be tolerated by said means for estimating.

11. The communication system according to claim 8, wherein said means for phase modulating employs a modulation index h=0.25 and samples each symbol 4 or 8 times to limit a number of possible phase shift possibilities to 32 or 64, respectively.

12. A method comprising the steps of:

phase modulating a constant amplitude signal with digital information signals to transmit a sequence of symbols over a communications channel;

sampling the phase modulated signal N times per symbol period T and storing the N resulting samples;

digitally filtering the N samples to produce a filtered output signal having a constant amplitude and phase response substantially contained within a normalized frequency of $|fT|=1$, wherein the constant amplitude signal is modulated at a modulation index h=0.25 and N=4 or 8.

13. The method according to claim 12, further comprising the step of:

after the filtering step, amplifying the filtered signal with a high efficiency, nonlinear power amplifier.

14. The method according to claim 12, further comprising the step of:

receiving a signal containing a received sequence of interfering symbols over the communications channel;

demodulating the received signal; and estimating a sequence of symbols from the interfering symbols using a Viterbi algorithm.

15. The method according to claim 12, wherein intersymbol interference generated by the filtering step is controlled by modifying the filter amplitude response to reduce an amount of amplitude modulation added by the filtering step.

16. The method according to claim 15, wherein the amount of amplitude modulation added by the filtering step is defined such that a magnitude ratio of a maximum, filtered, phase modulated signal to a minimum, filtered, phase modulated signal is less than or equal to approximately one decibel.

17. The method according to claim 12, wherein the filtering step further includes:

multiplying the N samples by N predetermined filter coefficients to generate N filter products;

summing the N filter products to generate the filtered signal.

* * * * *